United States Patent [19]

Glazar et al.

[11] 4,073,681

[45] Feb. 14, 1978

[54] NUCLEAR REACTOR SHUTDOWN SYSTEM

[75] Inventors: James M. Glazar, Poway; Erich H. P. Hoffmann, Escondido, both of Calif.

[73] Assignee: General Atomic Company, San Diego, Calif.

[21] Appl. No.: 555,687

[22] Filed: Mar. 5, 1975.

[51] Int. Cl.² ............................................ G21C 7/08
[52] U.S. Cl. ................................. 176/36 R; 176/22; 176/DIG. 5
[58] Field of Search ............... 176/22, 36, 86, DIG. 5; 49/4, 7, 8; 317/66; 337/4

[56] References Cited

U.S. PATENT DOCUMENTS

| 3,105,033 | 9/1963 | Camac | 176/22 |
| 3,751,334 | 8/1973 | Sturmer et al. | 176/36 R |

FOREIGN PATENT DOCUMENTS 897,455  5/1962  United Kingdom ................... 176/22

OTHER PUBLICATIONS

KAPL-M-LBV-7, "Reactor Safety Fuses," Vandenberg, 9/23/55, pp. 2-5, 35.

Primary Examiner—Stephen C. Bentley
Assistant Examiner—S. A. Cangialosi
Attorney, Agent, or Firm—Fitch, Even, Tabin & Luedeka

[57] ABSTRACT

A shutdown system is described for a nuclear reactor wherein a gate, which allows poison to pass to the reactor core, is allowed to move to an open position upon the severing of a fuse link by electric current passed therethrough.

3 Claims, 5 Drawing Figures

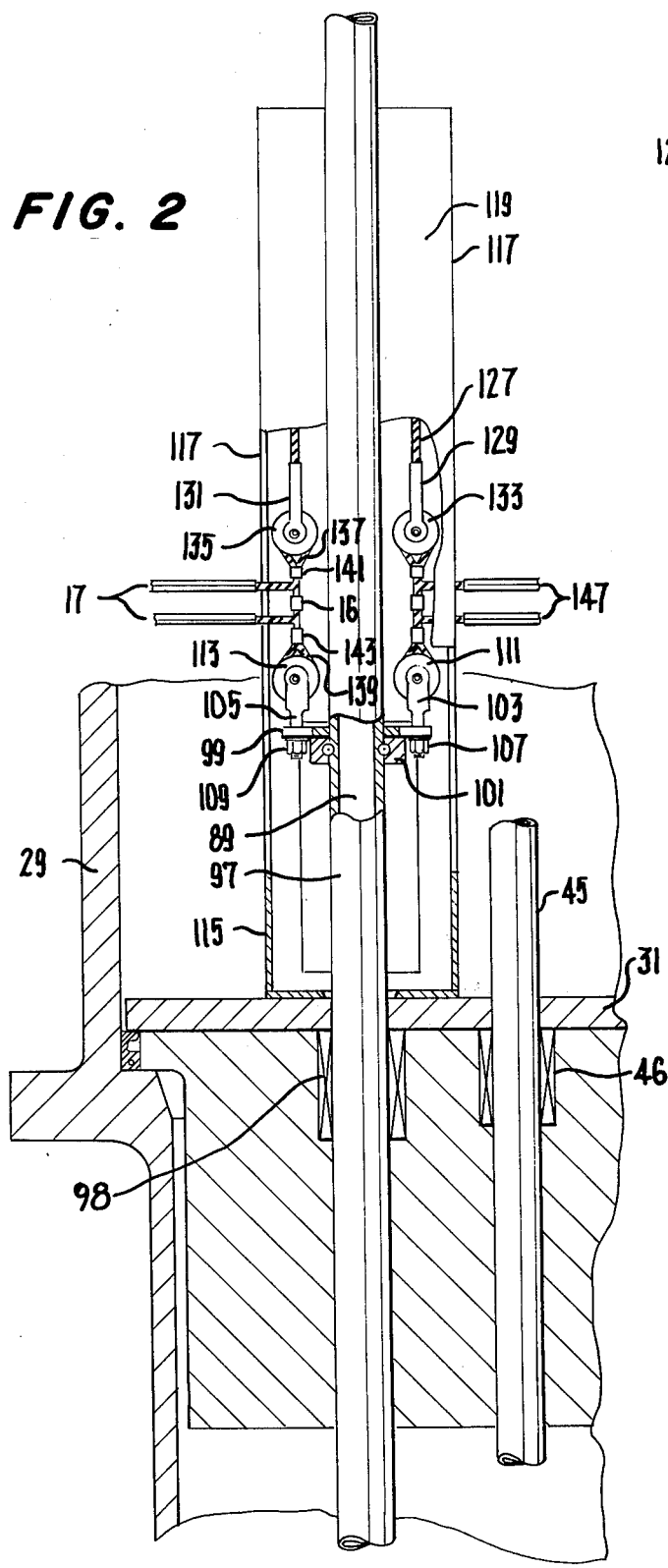
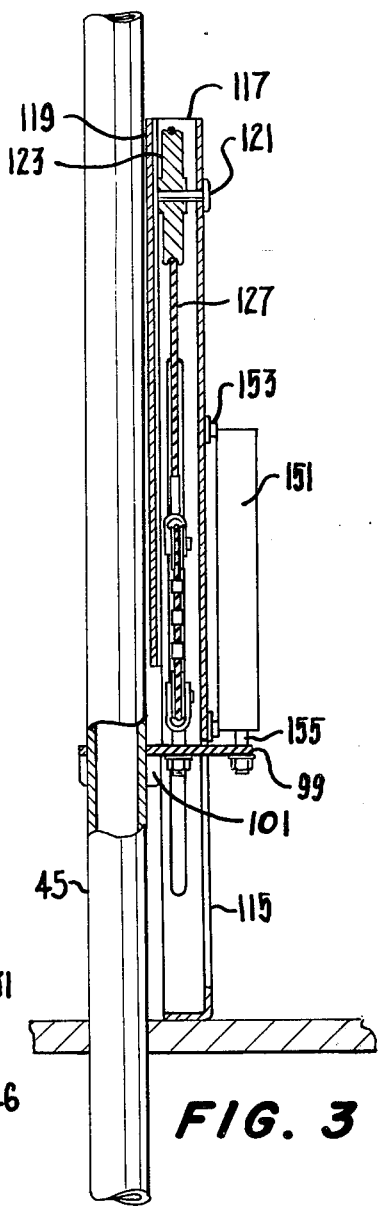
FIG. 2
FIG. 3

NUCLEAR REACTOR SHUTDOWN SYSTEM

This invention relates generally to nuclear reactors and, more particularly, to an improved shutdown system for a nuclear reactor.

A typical nuclear reactor employs movable control elements or rods of graphite or similar material having high neutron capture cross section for regulating the neutron flux in the reactor core. In most designs, the reactor may be shut down completely upon full insertion of a predetermined number of control rods or elements into the reactor core.

The use of control rods for the purpose of emergency scramming or shutting down of the nuclear reactor as well as for performing ordinary control functions is well known. Generally, such a system employs means for rapidly advancing the control rods into the reactor core in response to a pre-arranged signal, such as the automatic sensing of a failure in the core coolant system.

Under some circumstances, it may be desirable to provide for a secondary shutdown system which will effect a complete shutdown of the nuclear reactor in the event of an emergency in the presence of a failure of the control rod emergency scram system. Such a secondary or redundant system may be particularly important in the case of a pressurized gas-cooled reactor, since a failure of the main coolant system could result in a rapid drop in coolant pressure. The need to shut down the reactor without delay therefore may necessitate the employment of a secondary shutdown system of high reliability and simple operation in the event the main shutdown system fails or is delayed.

It is an object of the present invention to provide an improved shutdown system for a nuclear reactor.

Another object of the invention is to provide a secondary shutdown system for a nuclear reactor which is low in cost and reliable of operation.

A further object of the invention is to provide a secondary shutdown system for a nuclear reactor which is capable of functioning independently of the remaining elements of the nuclear reactor.

Other objects of the invention will become apparent to those skilled in the art from the following description, taken in connection with the accompanying drawings wherein:

FIG. 2 is an enlarged full section side view illustrating the system of the invention in greater detail;

FIG. 3 is a side view, partially in section, of the system of FIG. 2;

Very generally, the shutdown system of the invention employs a poison reservoir 11, means 12 for conducting the poison in the reservoir to the core of the reactor, and gate means 13 movable between closed and open positions to allow, in the latter position, poison to pass from the reservoir to the core of the reactor. Means 15 retain the gate means in the closed position and include at least one fuse link 16 severable in response to a predetermined magnitude of electric current passed therethrough to allow the gate means to move to the open position. Means 17 provide for conducting electric current to the fuse link.

The shutdown system specifically described and illustrated herein is for use with a nuclear reactor of the type described generally in U.S. Pat. No. 3,359,175 issued Dec. 19, 1967 and assigned to the United States of America as represented by the United States Atomic Energy Commission. It is to be understood, however, that the shutdown system of the invention may be used in connection with other types of reactors. The shutdown system of the invention is designed primarily for use as a secondary shutdown system. It would, however, be possible to use the shutdown system of the invention as the primary means for scramming the reactor, rather than utilizing fast insertion of control rods as is more commonly the case.

Figure 1:
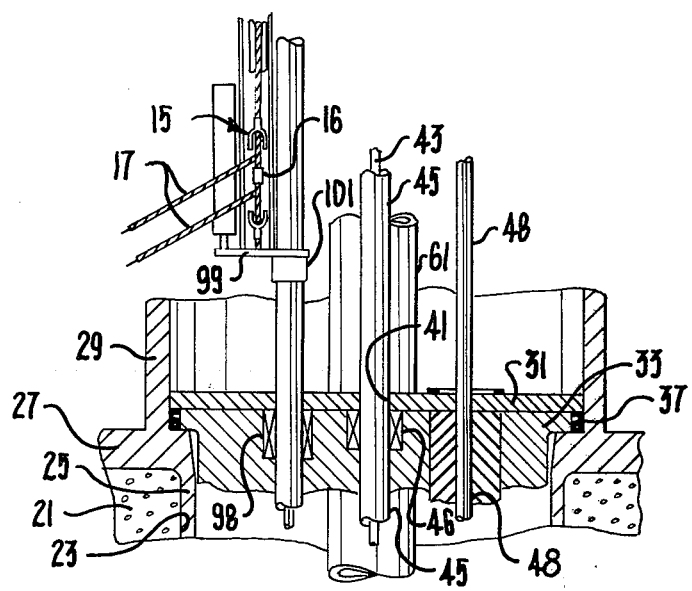
FIG. 1 is a sectional side view of portions of a nuclear reactor employing the system of the invention.
Figure 1:
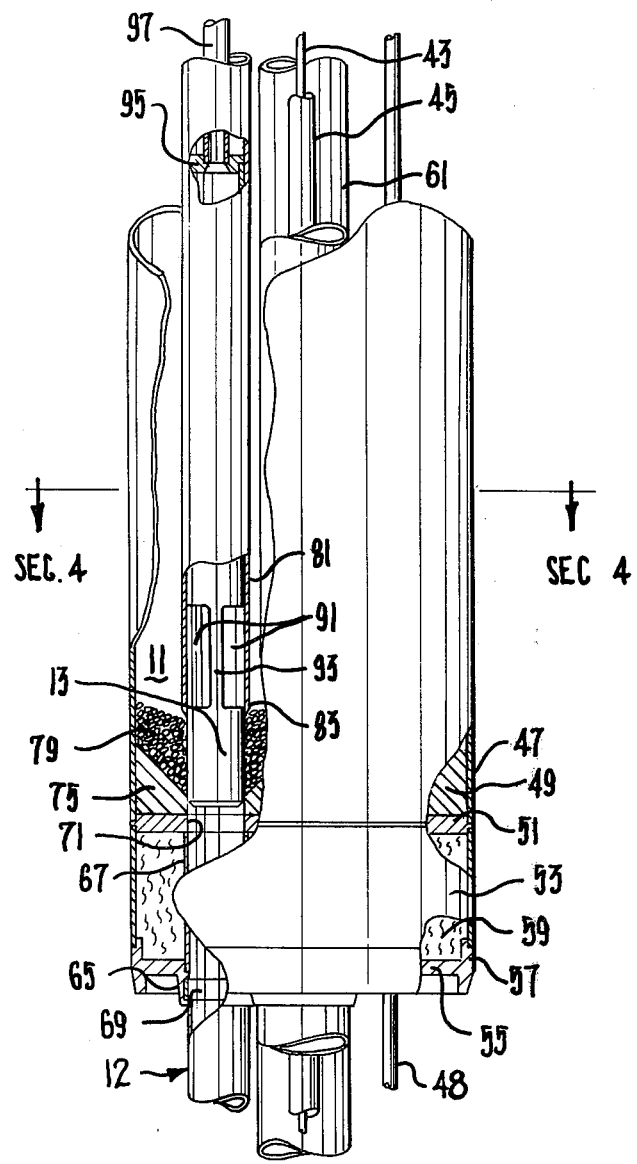

Referring now particularly to FIG. 1, the manner in which the shutdown system of the invention is mounted within a nuclear reactor may be seen. A prestressed concrete reactor vessel 21 is provided with a penetration 23 therein which is lined by a suitable metal penetration liner 25. The penetration liner has a top flange 27 which extends outwardly of the penetration at the top surface of the reactor vessel 21. A mounting cylinder 29 extends upwardly from the flange 27 and a circular mounting plate 31 seats within the cylinder 29 spanning the interior thereof. The plate 31 is bolted to a plug 33 and the outer periphery of the plate 31 is sealed to the penetration liner by a suitable rubber seal 37.

The plate 31 has a central opening 41 therein to allow passage of various elements for controlling reactor operation. Thus, a cable 43 extends through the plate 31 for the purpose of opening and closing an orifice device, not shown, to regulate the flow of primary coolant over the reactor core. A tube 45 is provided coaxially of the cable 43 for the purpose of mounting the orifice device, not shown. A suitable ball bushing 46 is provided within the plug 33 for supporting the tube 45. A flux monitoring unit guide tube 48 also passes through the plate 31.

At the lower end of the reactor vessel penetration, a seal structure is provided within a cylindrical housing 47. The housing 47 contains a suitable neutron shield 49, such as a boronated graphite, and is closed at its lower end by a circular plate 51. A cylindrical wall extension 53 depends from the plate 51 and is closed by a circular bottom plate 55 having an outer mounting flange 57. The cavity thus formed is filled by a thermal barrier 59 of suitable construction. Passages are provided within the neutron shield 49 and thermal barrier 59 for the passage of the tube 45. Tubes 61 for control rod assemblies, not shown, pass through the shield 49 and barrier 59, and extend up through the plate 31 as well.

Figure 4:
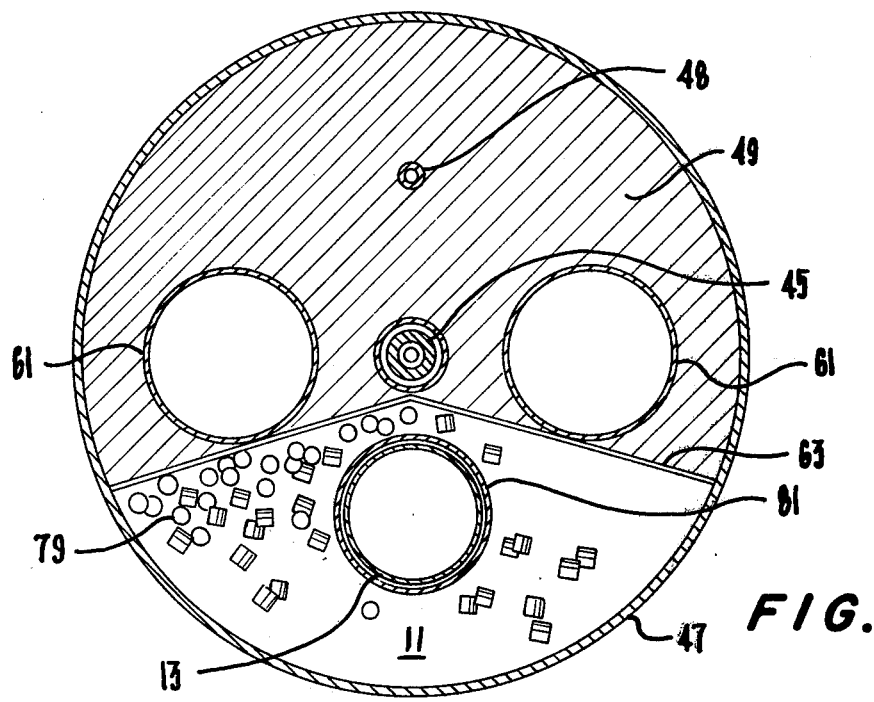
FIG. 4 is a sectional view taken along the line 4—4 of FIG. 1.

As may be seen in FIG. 4, a section of the interior of the housing 47 is walled off by a transverse wall 63 so that roughly 40% of the internal cross section of the housing 47 remains unoccupied by the neutron shield 49. This enclosed volume forms the reservoir 11.

The conducting means 12 in the illustrated system comprise a tube which extends from the core, not shown, to terminate in a flange 65 depending from the plate 55. An extension 67 of the tube 12 is mounted thereto by a connecting ring 69 secured within the flange 65 and passes through the thermal barrier 59 and through the opening 71 in the plate 51. A funnel-shaped annular block 75 rests upon the plate 51 just above the opening 71 and surrounding same. The block 75 thus forms a funnel for channeling the poison material into the tubes 67 and 12 for passing into the core, not shown.

The poison material is illustrated at 79 within the poison reservoir 11. In the illustrated embodiment, the poison material comprises small cylinders or slugs of boronated graphite. These are made sufficiently small so as to flow freely from the reservoir into the tubes 67 and 12 and from thence into the core upon opening of the gate 13, which will be described more completely below.

A tube 81 is aligned on the axis of the tubes 12 and 67 and passes upwardly within the housing 47. The lower periphery 83 of the tube 81 terminates a distance above the upper end of the tube 67 to provide a space through which the poison material 79 may flow. During normal reactor operation, this space is closed by the cylindrical gate 13 which slides within the tube 81 and the tube 67 coaxially thereof. The poison material 79 settles and positions itself completely surrounding the gate 13.

The tubular gate 13 is terminated at its upper end by a plate 95. An extension tube 97 extends upwardly from the plate 95 inside the tube 81 through a ball bushing 98. The extension tube 97 passes upwardly to the retaining means 15 as will be described subsequently. The gate 13 is provided with a pair of windows 91 cut therein. The windows occupy substantially the entire periphery of the gate, leaving only a pair of supporting struts 93 extending therebetween from the upper and lower sections of the gate. The length of the windows 91 coincides with the spacing between the lower periphery 83 of the tube 81 and the end of the tube 67. Thus, when the gate is moved axially within the tubes 81 and 67 in order to cause the windows 91 to register with the space between the lower end 83 of the tube 81 and the upper end of the tube 67, the particles 79 are allowed to flow through the windows and down through the tubes 67 and 12 into the reactor core.

Although some of the details of the retaining means 15 may be seen in FIG. 1, reference is made to FIGS. 2 and 3 for a detailed description thereof. The tube 97 passes upwardly through the reactor penetration and into the space within the cylindrical extension 29. The ball bushing 98 is provided to allow for free axial movement of the tube 97. A horizontal plate 99 is secured to the tube 97 by means of a mounting bushing 101. Mounting brackets 103 and 105 are supported on the plate 99 by suitable threaded connectors 107 and 109, respectively. A pulley 111 of non-conductive material is mounted on the bracket 103, and a similar pulley 113 is mounted on the bracket 105.

A large support bracket 115 is secured to the top of the plate 31 spanning the lower end of the cylindrical extension 29. The bracket 115 is formed into a partial enclosure of rectangular cross section toward its upper end by side walls 117 and a front wall 119. An axle 121 spans the space between the bracket 115 and its front wall 119 and supports a pulley 123. A cable 127 is passed around the pulley 123, and each end of the cable is secured to a bracket 129 and 131, respectively. The bracket 129 supports a pulley 133 of non-conductive material, and the bracket 131 supports a similar pulley 135.

In the illustrated embodiment, two fuse links are provided. The fuse link 16 is positioned between the two pulleys 113 and 135, connected thereto by cable loops 137 and 139 and collars 141 and 143. A similar connection, not numbered, couples the pulleys 111 and 133. Preferably, the fuse link is comprised of two metallic elements in intimate contact with each other and which, when brought to a given predetermined temperature by the passage of electrical current therethrough, alloy rapidly. Preferably, such alloying occurs at relatively low current and without the support of oxygen and therefore is unaffected by an inert environment. Initiation of the alloying process results in a severing of the fuse link.

For conducting electrical current to the fuse link 16, a pair of electrical conductors 17 are provided. Similar conductors 147 are provided for the other fuse link. These conductors may be passed through a suitable electrical connector to an external source of current, not illustrated.

For the purpose of monitoring the position of the gate 13, a linear potentiometer 151 is provided. The lower end of the potentiometer is mounted to the plate 99, and the upper end is suitably secured such as by a nut 153 to the bracket 115. The plunger 155 of the potentiometer is connected to the plate 99 and therefore the position thereof relates to the position of the gate 13.

Figure 5:
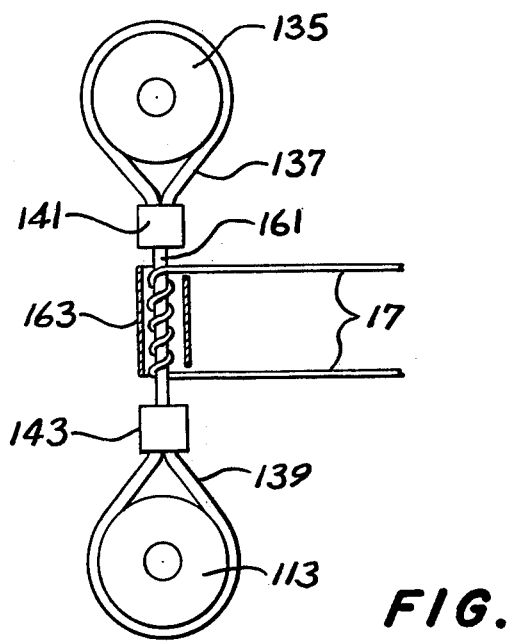
FIG. 5 is an enlarged sectional view illustrating a fuse link portion of the apparatus of FIGS. 1-3.

Referring now to FIG. 5, a preferred form of the fuse link 16 is shown in section and greatly enlarged. The fuse link illustrated includes a main section 161 which extends between the collars 141 and 143. The segment 161 comprises a plurality of wires each having two coaxial elements of different metals which are in intimate contact with each other. When brought to a given predetermined temperature, the metals alloy rapidly in a reaction which occurs without the support of oxygen. Such wire is obtainable under the trademark PYROFUSE and alloys exothermically at a relatively low temperature. The number of wires in the main segment 161 depends upon the weight to be supported. In a typical structure, 96 strands of 0.005 inch diameter PYROFUSE wire will satisfactorily support the necessary load.

The conductors 17 which carry the current to and from the fuse link are wrapped helically around the section 161 in intimate contact therewith. The conductors 17 are also comprised of coaxial wires of the type described and may be substantially fewer in number than the wires in the main section 161, since they do not carry loads. The conductors 17 may be satisfactorily constructed of eight strands of 0.004 inch thick PYROFUSE wire. A sleeve 163 of a suitable electrically non-conductive material, such as polyolefin, is shrink-fit over the fuse link 16.

A constant current of approximately 10 amps will typically be sufficient to initiate alloying of the helically wound portion of the conductors 17. Within about two seconds, the exothermic chemical alloying reaction occurring in the helical portion due to the electrical current therethrough initiates the alloying process in the main section 161. Some current, of course, will pass through the main section as a result of the intimate contact of the helical portion and will also contribute to the heating. The rapid alloying of the wire causes the material to ball-up and the fuse link is thus severed.

In operation of the shutdown system of the invention, a flow of electrical current may be initiated through one or both of the fuse links, either through activation of a remote emergency sensor or through activation by the reactor operator. In either case, a current flow of 15 amps causes severing of the fuse link and therefore allows the gate 13 to fall downwardly as a result of the force of gravity. Severing of either one of the fuse links will allow the gate to fall, since the pulley allows the cable to pass over it even though one of the links is not severed. This redundancy insures that a faulty fuse link will not prevent emergency shut down.

When the gate 13 falls, the bushing 101 comes into contact with the upper surface of the plate 31, therefore stopping the gate in the position at which the windows 91 are aligned with the space between the lower end 83 of the tube 81 and the upper end of the tube 67. Thus, the poison is allowed to flow through the windows and through the tubes 67 and 12 into the reactor core. The weight of the gate should, of course, exceed the frictional load on the gate and it is preferable that this be approximately 10 times the frictional load. The fixed sleeve 81 inside of which the gate operates limits the amount of friction on the gate by limiting the amount of poison material which bears against the gate.

In-place on-line testing of the reserve shutdown actuation system is a relatively simple procedure. Suitable connection is made to pass a small electrical current through the fuse links which is insufficient to cause alloying thereof. Detection of the presence of the current passing through the links will indicate that the links are sound.

It may therefore be seen that the invention provides an improved shutdown system for a nuclear reactor. More particularly, the invention provides a shutdown system which may be readily incorporated as a reserve shutdown system and which is highly reliable and relatively low in cost.

Various modifications of the invention in addition to those shown and described herein will become apparent to those skilled in the art from the foregoing description and accompanying drawings. Such modifications are intended to fall within the scope of the appended claims.

What is claimed is:

1. A shutdown system for a nuclear reactor comprising, a poison reservoir, gate means movable from a closed position to an open position by the force of gravity, means for conducting poison in said reservoir to the core of the reactor in response to the opening of said gate means, means for retaining said gate means in the closed position, said retaining means comprising a pulley, a flexible cable passing partially around said pulley, and a pair of fuse links, each linking one end of said cable with said gate means and extending substantially parallel with each other, each of said fuse links comprising two contacting metallic elements capable of alloying rapidly at a given temperature, said fuse links being severable at the given temperature in response to a predetermined magnitude of electric current passed therethrough to allow said gate means to move to the open position, and means for conducting electric current to said fuse links wherein each of said fuse links comprises a main element of sufficient size to support the load of said gate means, a current conducting segment contacting said main element, wherein said current conducting means extend from respective ends of said current conducting segment, and wherein said main element and said current conducting segment are each comprised of a plurality of wires having two contacting metallic elements capable of alloying rapidly and exothermically at said given temperature.

2. A shutdown system according to claim 1 wherein said poison conducting means comprise a tube having at least one opening in the wall thereof, wherein said reservoir is positioned adjacent the exterior of said tube at said opening therein, and wherein said gate means comprise a hollow cylinder coaxial with said tube and having at least one window therein, said cylinder being movable axially within said tube so that said window registers with said opening in the open position and does not in the closed position.

3. A shutdown system according to claim 1 wherein said current conducting segment is helically wound about said main element.

* * * * *